Patented June 10, 1930

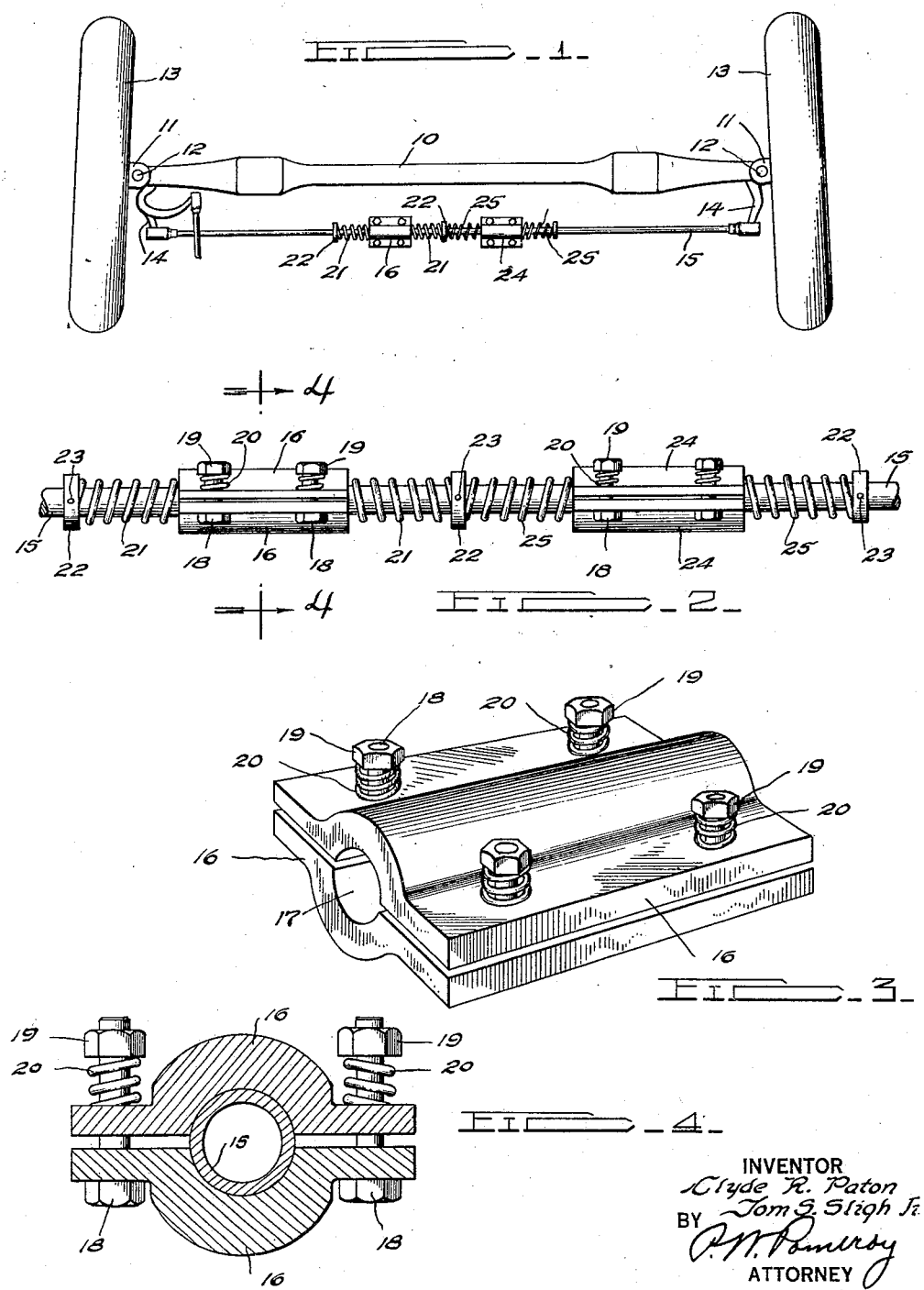

1,763,064

UNITED STATES PATENT OFFICE

CLYDE R. PATON AND TOM S. SLIGH, JR., OF SOUTH BEND, INDIANA, ASSIGNORS TO THE STUDEBAKER CORPORATION, OF SOUTH BEND, INDIANA, A CORPORATION OF NEW JERSEY

AUTOMOBILE CONSTRUCTION

Application filed November 22, 1926. Serial No. 150,062.

This invention relates to automobile construction, and deals particularly with those violent vibratory movements of parts thereof commonly known as "shimmy," the principal object being the provision of a device for developing forces in opposition to the forces tending to cause shimmy and thereby eliminating the effects thereof.

Another object is to provide a means for taking up the energy tending to cause shimmy of parts of an automobile and dissipating the same, whereby the effect thereof is substantially overcome.

Another object is to provide, in combination with those parts of an automobile subject to shimmy, a secondary vibratory system for absorbing energy from the shimmying parts and dissipating the same, whereby to eliminate the deleterious effects thereof.

Another object is to provide, in combination with those parts of an automobile subject to those vibratory movements known as shimmy, a secondary vibratory system having a natural period of vibration such that it will take up energy from said parts and will dissipate the same, whereby shimmying of said parts will be opposed.

Another object is to provide, in combination with those parts of an automobile subject to shimmy, a spring-controlled mass having a suitable natural period of vibration, mounted to be affected by said shimmy, whereby the mass will absorb energy from said parts and will be caused to vibrate, means being provided for dissipating the energy so absorbed.

Another object is to provide, in combination with a part of an automobile subject to shimmying movement, a spring-controlled mass movable with respect to the shimmying part and having a natural period of vibration bearing a suitable relation to the period of vibration of said part due to shimmy, said mass being capable, by reason of the suitable relation of the periods of vibration, of taking up energy from said part, with suitable means provided for dissipating this energy by frictionally resisting the motion of said mass.

Another object is to provide, in combination with a part of an automobile subject to shimmying movement, a spring-controlled mass movable with respect to such part and having a natural period of vibration bearing a suitable relation to the period of vibration of such part, whereby the energy in such part due to its shimmying movement will be converted into a vibratory movement of greater amplitude of said mass whereby such energy may be more conveniently and expeditiously dissipated.

Another object is to provide a weight slidably mounted on the cross tube of an automobile, means being provided for frictionally resisting such sliding, and springs tending to hold said weight in a predetermined position, such springs being so proportioned that the natural period of vibration of said weight on said cross tube approximately conforms to the period of the shimmying vibration of said cross-tube, or a harmonic thereof.

Another object is to provide a plurality of weights slidably mounted on the cross tube of an automobile, springs being provided for tending to hold said weights in a predetermined position and being so proportioned that the natural period of vibration of the weights along the cross tube approximately conforms to the period of the shimmying vibration of the cross tube or a harmonic thereof, and means being provided for frictionally resisting the movement of each weight in a degree different from another of said weights whereby said weights will be successively set in motion by shimmying movement of the cross tube.

A further object is to provide, in combination with those parts of an automobile subject to shimmying movement, a secondary vibrating system adapted to take up energy from said parts and be set in motion thereby, means being provided for frictionally resisting the motion of said secondary system in a degree increasing with the amplitude of vibration of said secondary system.

The above being among the objects of the present invention, the same consists of certain features of construction and combinations of parts to be hereinafter described with reference to the accompanying drawings, and then claimed, having the above and other objects in view.

In the accompanying drawing which shows a suitable embodiment of the present invention, and in which like numerals refer to like parts throughout the several different views, Figure 1 is a plan view of an automobile front axle, steering knuckles, wheels and cross tube, with a suitable embodiment of the present invention mounted on the cross tube.

Figure 2 is an elevation of that part of the cross tube of Figure 1 including the embodiment of the present invention.

Figure 3 is a perspective view of one pair of the weights shown mounted on the cross tube of the preceding figures.

Figure 4 is a sectional view taken on the line 4—4 of Figure 2.

Those violent vibratory movements of the steering mechanism of automobiles commonly known as "shimmy" have, since the advent of the so-called low pressure or "balloon" tires in the motor vehicle industry, assumed proportions of great concern, and much time and energy have been spent in attempting to eliminate the same or the effects thereof. Various and widely different theories have been advanced as to the cause of shimmy and various remedies suggested, and while some such remedies have been more or less successful in respect to certain constructions and conditions, they have not, to our knowledge, presented a satisfactory remedy for the majority of cases. Some have attempted to eliminate shimmy by the application of friction devices applied to directly resist movement of the shimmying parts, which is witnessed by those constructions employing frictional joints between parts moving relative to each other, such as at the point of connection of the cross tube with the steering knuckle arm, and such as the use of conventional type shock absorbers between the front axle and cross tube. Such devices, while materially reducing the shimmy, increase the effort required to steer the automobile, and thus directly destroy the advantage of easy steering which all automobile manufacturers attempt to include in their product and which is far more desirable with low pressure tires than ever before.

With these problems in mind we have provided a construction which, although it does not remove the cause of shimmy, removes the effect thereof to such an extent that it substantially eliminates the same, and does eliminate it as far as all practical results are concerned, without affecting the ease of steering in any manner whatsoever. In doing this we consider those parts whose motion constitutes the shimmying movement as a primary vibrating system having a period of vibration equal to the number of oscillations of those parts in a given interval of time. We then provide a secondary vibratory system carried by, or so connected to, such parts as to be affected thereby, and having a natural frequency of vibration substantially the same, or slightly less, than the frequency of vibration of the primary system, or of a harmonic thereof. The result is that upon vibration or shimmying of the primary system, the secondary system is caused to vibrate in sympathy therewith and in opposite phase thereto, and absorbs energy from the primary system. Means are provided for frictionally resisting this sympathetic vibration of the secondary system whereby such energy is dissipated, with the result that the energy tending to cause shimmy of the primary system is dissipated and substantially no shimmy occurs.

While such secondary vibrating system may assume many different forms and may be placed in a variety of positions to be affected by the vibration of the primary system, and various means may be provided for frictionally resisting the movement of the secondary system to dissipate the energy therein which has been absorbed from the primary system, we show in the accompanying drawing by way of illustration one embodiment which successfully accomplishes the result desired. Accordingly, in Figure 1 is shown an automobile front axle 10 in plan view, the ends of which pivotally carry the steering knuckles 11 by king pins 12 in a conventional manner. Wheels 13 are rotatably carried by the knuckles 11 and each knuckle 11 is provided with a rearwardly extending arm 14, the arms 14 being joined for related movement by the conventional cross tube 15. These are the main parts of an automobile which shimmy and which for ease of description may be considered as the primary vibratory system referred to in the particular embodiment of the invention described, although other parts may properly be included, such as parts affected by the movement thereof, but not properly a part of the system. These parts when shimmying have substantially a constant period of vibration, the movement of the cross tube 15 being primarily in the direction of its length. The secondary vibratory system which is provided to absorb or take up energy from the primary vibratory system is shown as including a mass made up of a pair of weights 16, each provided with a semi-circular longitudinally extending groove 17 which is adapted to receive the cross tube 15, the weights being positioned in opposing relationship to enclose the cross tube 15, and held in position by bolts 18 which pass through both weights 16 and receive nuts 19 on their projecting ends. Coil springs 20 interposed between the nuts 19 and the adjacent face of the adjacent weight 16 cause the weights 16 to resiliently embrace the tube 15, the pressure with which they so embrace the tube 15 being adjustably controlled by the nuts 19 so that the friction between the weights 16 and the cross tube 15, resisting the movement of the weights 16 therealong, may be controlled. The pressure is, in fact, sufficiently light that a small endwise movement of the cross tube 15 will cause the weights 16 to move thereon.

Encircling the cross tube 15 on each side of the weights 16 are coil springs 21, abutting against the ends of the weights 16, and held under a predetermined compressive pressure between such ends and the collars 22 which also encircle the cross tube 15 and are held against axial movement by pins 23. The springs 21 and weights 16 are so proportioned that the natural period of vibration of the weights 16 along the cross tube 15 is approximately equal to the period of shimmy vibration of the primary system, or is a harmonic thereof. The result is that as soon as the primary system begins to shimmy the weight 16 will begin to vibrate in sympathy therewith and in opposite phase thereto, due to the relation of the natural periods of vibrations of the two systems and the energy causing the vibration of the weights 16 will be taken up or absorbed from the primary system. Due to the friction between the weights 16 and the cross tube 15, the energy taken up by the weights 16 is dissipated by the same, and the energy tending to cause shimmying of the primary system is taken up and dissipated and is not allowed to build up to a point where its shimmying effect is apparent.

We have found that the forces tending to cause shimmying are relatively small when the first tendency to shimmy occurs, but that these forces rapidly build up to a point where the shimmy is apparent and at times build up to such proportions as to cause exceedingly violent movements of the whole automobile. We have also found that if these forces are checked in their incipient stages they are prevented from building up to a point where their effect as a shimmy is apparent. For this reason we find that the amount of energy necessary to be dissipated to prevent the forces tending to cause shimmying from building up, is exceedingly small, and that the friction between the weights 16 and cross tube 15 need be very slight to attain the result necessary. If the springs 21 are made relatively long as shown in the drawings, the amplitude of vibration of the weights 16 will be much greater than the amplitude of vibration of the primary system and the energy taken up by the weights 16 from the primary system may be more conveniently and expeditiously dissipated thereby.

It will be apparent from the foregoing explanation that if, for some reason or other the shimmy should happen to develop to such proportions that the amount of friction described between the weights 16 and cross tube 15 would be incapable of dissipating the amount of energy then taken up by the weights 16 from the primary system, the shimmy would not be stopped. In order to prevent such an occurrence a second pair of weights 24, which may be identical to the weights 16, are provided on a different portion of the cross tube 15 and held between springs 25 which are themselves confined in partly compressed state between the ends of the weights 24 and the collars 22. The springs 25 and weights 24 are proportioned in the same manner as the springs 21 and weights 16 previously described, so that the natural period of vibration of the weights 24 along the cross tube 15 corresponds to the natural period of shimmy vibration of the primary system or a harmonic thereof. In this case, however, the nuts 19 are drawn up on the bolts 18 to a greater extent than in the case of the weights 16, so as to cause the weights 24 to more firmly engage the cross tube 15 whereby more resistance is offered to movement of the same along the cross tube 15 than is offered in the case of the weights 16. The result of this additional system is that should the amount of energy in the primary system due to shimmying movement build up to a point great enough to overcome the resistance between the weights 24 and cross tube 15, the weights 24 will be set in motion and due to their greater capacity to dissipate energy through greater friction between the same and the cross tube 15, any energy not capable of being dissipated by the weights 16 will thus be taken up by the weights 24 and dissipated and thereby eliminate any apparent shimmy in the primary structure.

It is preferable in using such a dual secondary system, that the weights 24 be affected by the shimmy before the energy dissipating capacity of the weights 16 has been reached, thereby tending to more quickly reduce the forces tending to cause shimmy. The effect of increasing the energy-dissipating qualities of the secondary system with the increase of shimmy movement of the primary system may be acquired without the addition of the secondary weight 24, if means are provided for increasing the frictional resistance of the first weight 16 in proportion to the amplitude of vibration of the secondary system, and this result may be acquired either by rubbing or liquid friction in several different ways.

It is to be noted that the present invention does not aim to eliminate the cause of shimmying, nor does it attempt to eliminate shimmy completely but it does contemplate the control of the forces tending to cause shimmying and keep these forces to such a small value that the effects thereof are eliminated as far as practical results are concerned. This will be apparent when it is seen that unless there is some vibration of the secondary system no energy will be dissipated, and unless there is some vibration of the primary system there will be no vibration of the secondary system. However, if the secondary system is in proper working condition the slightest shimmy vibration of the primary system will set the secondary system in motion and will prevent the forces tending to cause shimmy from building up to a point where it has any noticeable effect on the automobile of which it forms a part. It is also to be noted that the natural period of vibration of the secondary system does not need to exactly conform to the period of shimmy vibration of the primary system, or a harmonic thereof, but needs only to be such as to be capable of vibrating in sympathy therewith, and we have found that the results appear to be better if the natural period of vibration of the secondary system is slightly less than the period of shimmy vibration of the primary system.

It will also be noted that in this construction no additional resistance whatever is offered to the free turning of the steering wheels of the automobile, and no advantage whatever in any other structure of the automobile is sacrificed in obtaining the results acquired by the use of the present invention.

Formal changes may be made in the specific embodiment of the invention described, without departing from the spirit and substance of the broad invention, the scope of which is commensurate with the appended claims.

What we claim is:

1. In an automobile, in combination with those parts thereof subject to shimmying movement, a support constrained to move in direct relation with the movement of one of said parts, a mass slidably mounted on said support, spring means controlling the movement of said mass on said support, said spring giving said mass a natural period of vibration along said support approximating the period of vibration of said shimmy movement or a harmonic thereof, and spring means for frictionally resisting the sliding movement of said mass on said support.

2. In an automobile, in combination with a part subject to shimmying movement, a weight slidably mounted on said part, spring means controlling the sliding movement of said weight on said part, said spring means giving said weight a natural period of vibration approximating the period of shimmy vibration of said part, and spring means for causing said weight to frictionally engage said part whereby its vibratory movement is resisted by said friction.

3. In an automobile, a steering cross tube therefor, a weight slidably mounted on said cross tube, springs controlling the sliding movement of said weight on said cross tube, said springs giving said weight a natural period of vibration along said cross tube approximating the period of shimmy vibration of said cross tube, and spring means for frictionally resisting the free sliding action of said weight on said cross tube.

4. In an automobile, in combination with a steering cross tube therefor subject to shimmy vibration, a spring-controlled longitudinally divided weight slidably mounted thereon having a natural period of vibration therealong approximating the period of shimmy vibration of said cross tube to control the friction therebetween or a harmonic thereof, and means for frictionally resisting vibratory movement of said weight.

5. In an automobile, a cross tube, a two-part longitudinally divided weight slidably mounted thereon, spring means controlling the position of said longitudinally divided weight on said cross tube, and spring means for causing said weight to resiliently embrace said tube.

6. In an automobile having a cross tube, means to prevent shimmy thereof comprising a pair of weights provided with opposed depressions slidably receiving said cross tube, bolts extending through both of said weights, nuts on said bolts, springs between said nuts and the adjacent weight, and coil springs surrounding said cross tube and abutting against said weights whereby to control the position thereof on said cross tube.

7. In an automobile having a steering cross tube, means to prevent shimmy thereof, comprising a pair of spaced masses slidable thereon, spring means controlling the position of said masses on said cross tube, and means for frictionally resisting the sliding of said masses on said cross tube, said last named means restricting the sliding of one of said masses to a greater extent than the other of said masses.

8. In an automobile having a steering cross tube, means to prevent shimmying thereof comprising a pair of longitudinally split weights slidably clamped to said cross tube, springs means for resiliently controlling the clamping action of said weights in respect to said cross tube, and springs for controlling the axial position of said weights on said cross tube.

9. In an automobile, in combination with a cross tube subject to shimmy vibration, a pair of split weights slidably clamped on said cross tube, springs confining the axial positions of said weights proportioned to give said weights a natural period of vibration approximating the period of shimmy vibration of said cross tube or a harmonic thereof, and resilient means for adjustably regulating the clamping effect of each weight in respect to said cross tube whereby one of said weights may be adjusted to offer greater resistance to sliding on said cross tube than the other of said weights.

Signed by us at South Bend, Indiana, this 18th day of November, 1926.

CLYDE R. PATON.
TOM S. SLIGH, Jr.

CERTIFICATE OF CORRECTION.

Patent No. 1,763,064.                                    Granted June 10, 1930, to

CLYDE R. PATON ET AL.

It is hereby certified that error appears in the printed specification of the above numbered patent requiring correction as follows: Page 4, line 75, claim 4, after the article "a" strike out "steering" and after "tube" strike out "therefor"; same claim, lines 80 and 81, strike out "to control the friction therebetween"; same page, line 84, claim 5, before "cross" insert "steering" and after "tube" and before the comma insert "therefor"; line 90, after "tube" insert "to control the friction therebetween"; and that the said Letters Patent should be read with these corrections therein that the same may conform to the record of the case in the Patent Office.

Signed and sealed this 4th day of November, A. D. 1930.

(Seal)                                                                M. J. Moore,
                                                                                         Acting Commissioner of Patents.